United States Patent

Birnbaum et al.

[15] 3,643,437
[45] Feb. 22, 1972

[54] OVERSPEED PROTECTION SYSTEM FOR A STEAM TURBINE GENERATOR

[72] Inventors: Manfred E. Birnbaum, Pittsburgh, Pa.; Andrew S. Braytenbah, Pennsauken, N.J.; Arthur W. Richardson, West Chester, Pa.

[73] Assignee: Westinghouse Electric Corporation, Pittsburgh, Pa.

[22] Filed: Oct. 16, 1969

[21] Appl. No.: 866,965

[52] U.S. Cl............................60/73, 60/105, 290/2, 290/40
[51] Int. Cl...........................F01k 13/02, F01k 17/02
[58] Field of Search..............60/73, 105; 415/17; 290/2, 290/40

[56] References Cited

UNITED STATES PATENTS

| | | | |
|---|---|---|---|
| 3,198,954 | 8/1965 | Eggenberger et al. | 290/40 R |
| 2,939,289 | 6/1960 | Clark, Jr. | 60/105 |
| 3,069,859 | 12/1962 | Weehuizen | 60/105 X |
| 3,511,051 | 5/1970 | Mitchell | 60/105 X |

Primary Examiner—Martin P. Schwadron
Assistant Examiner—Allen M. Ostrager
Attorney—F. H. Henson, J. William Wigert, Jr. and R. G. Brodahl

[57] ABSTRACT

The disclosure relates to a steam turbine-driven electrical generating plant wherein a protection system is provided for preventing the turbines from reaching speeds which would result in damage to the turbines; such speeds resulting from a sudden partial or entire loss of the electrical load. A partial loss of the load is sensed by a comparison of the inlet pressure at the lower pressure turbine stages with the output power provided to the load. If the output power decreases according to a predetermined relationship and if the input pressure corresponds to a value above a predetermined percentage of rated load, the interceptor valve is closed for a predetermined period of time to stop steam flow between the steam reheating apparatus and the lower turbine stages and thereby to reduce turbine speed buildup during and up to the time that additional load is connected to the generator output. In the event of a total load loss, which is determined in the same manner as in the case of a partial loss of the load but with the additional criteria that the circuit breakers associated with the generator be opened, both the intercept valve and the main governor valve, which regulates the steam through the high-pressure turbine stages, are closed. Whenever the speed of the turbine generator exceeds a predetermined percentage of rated speed, an overspeed protection system maintains both the interceptor valve and the governor valve in a closed position and cooperates with the main governor valve control system to relieve steam pressure within the reheating apparatus.

29 Claims, 4 Drawing Figures

OVERSPEED PROTECTION SYSTEM FOR A STEAM TURBINE GENERATOR

BACKGROUND OF THE INVENTION

The present invention relates to a speed protection system for a steam turbine-generator system and more particularly to a system which is rapidly responsive to both partial and total load losses to prevent turbine damage which might otherwise result therefrom.

The trend in steam turbine design is toward increased generating capacity without a corresponding increase in the physical size of the turbine generator, i.e., toward an increased power-to-inertia ratio. Consequently, the turbine response times must be shorter than those in earlier turbine systems. Thus, if the load being powered by the turbine-driven generators is suddenly lost or reduced without a commensurate reduction in the steam input to the turbine system, rapid turbine acceleration will occur. Present governor valve control and protection systems do not have sufficiently fast response times to reduce steam flow before the maximum allowable turbine speed has been reached. Typically, maximum allowable speed is at about 120 percent of rated speed. Also, because the effect upon a turbine system will be different depending upon whether or not a partial or total loss of load occurs, different responses are required for adequate protection of the turbine system, depending upon the extent of the loss.

In one well known prior art steam turbine control system, a mechanical governor is utilized to protect against turbine overspeed. Typically, this type of governor is a spring-loaded, centrifugally operated device which responds to an actual change in turbine speed to stop steam flow to the turbines. While such an arrangement is satisfactory in slower responding turbine systems where the power-to-inertia ratio is relatively small, such a system in today's turbines is unsatisfactory since the slow response time inherent in such a governor would not allow remedial action to be taken to maintain turbine speed below the maximum permissible level within the time required to do so.

When the pressure is maintained or increases at the input of one or more of the turbine stages and at the same time the power provided to the load decreases, the turbine speed must increase accordingly. Thus, by comparing the power provided to the load with the input pressure to one or more of the turbine stages and utilizing this information to prevent further flow of steam to the turbine, it has been found that a faster reacting protection system results. This technique is referred to as "disturbance feedback" in an article published in The English Electric Journal entitled "The Control or Governor Gear for Steam Turbines" by W. Twynham, pages 144 through 156 (1941). It permits feedback of information regarding anticipated increase in turbine speed before the speed of the turbine has been appreciably affected where the load is separated from the output of the generator. Prior art systems utilizing this technique, however, make no distinction between partial and total load losses and consequently do not respond in an optimum manner for one or both of these conditions.

In another prior art system, the generator output is switched to an auxiliary standby load upon the occurrence of a fault in the line. The standby load is selected to match the impedance of the faulted load so as to dissipate the power provided from the generator and thereby prevent system instability and turbine overspeed. During the transition the control valves regulating the turbine steam flow to the turbine or stages of the turbine are closed temporarily so that the switchover period can occur without excessive turbine speed buildup during this time. Here again no differentiation is made between a partial and total loss of load. The only action taken is to close the main control valve even though a less drastic action is required, as where a partial load loss has occurred.

SUMMARY OF THE INVENTION

The present invention is operative to prevent overspeed of a steam turbine having high power-to-inertia ratios both where a partial and a total loss of load occurs. It functions cooperatively with the main turbine control system. In the preferred embodiment of the invention, the main turbine control system is of the type referred to by those skilled in the art as an "electrohydraulic" or EH turbine control. However, other more traditional turbine control systems, either mechanical or hydraulic, can be utilized with the present invention. An analog form of such an electrohydraulic system is described in a paper entitled "Electro Hydraulic Control for Improved Availability and Operation of Large Steam Turbines" presented to the ASME-IEEE National Power Conference, Sept. 19-23, 1965. A digital EH system (DEH), which utilizes a programmed digital computer, is described in patent application Ser. No. 772,779 entitled "Improved System and Method for Operating a Steam Turbine and an Electric Power Generating Plant" filed by Theodore C. Giras and Manfred E. Birnbaum on Apr. 19, 1968 and assigned to the present assignee. Hereinafter the term EH controller will include both the EH and the DEH-type control systems.

In general, the EH controller is operable in response to turbine speed and output power to control the flow of steam through the turbine stages by controlling the opening of the main governor valve and hence the rate of steam flow. Reference should be made to the above cited reference and other prior art references for a detailed description of the operation of an EH control system.

The power provided by the steam turbines, i.e., the input to the electrical generator, is nearly linearly related to the turbine inlet steam pressure. For the purposes of this discussion, the inlet steam pressure is defined as the pressure at the inlet to the lower stage turbines and is synonomous with the reheat pressure. It follows, therefore, that a comparison of the generator input and output can be made by comparing the inlet steam pressure with electrical power provided by the generator. If a partial or total loss of load occurs the power provided by the generator will drop rapidly while the inlet steam pressure remains relatively constant, i.e., the power provided by the steam turbine to the electrical generator exceeds the electrical power generated. For the purposes of the present invention inlet steam pressure may be used to designate actual steam pressure or as a representation of power provided by the steam turbine.

The present invention utilizes this relationship to detect and respond to a partial loss of load as follows. When the inlet pressure to the lower pressure turbines is related in a predetermined manner to the power provided by the generator, and when the turbine inlet pressure corresponds to a value greater than a predetermined percentage of rated load, such as 30 percent, load-anticipator means are provided for closing the interceptor valve to stop the flow of steam from the reheater apparatus to the lower pressure turbines.

The interceptor valve remains closed for a short period of time, desirably 0.6 to 1.2 seconds. The valve itself closes in approximately 0.15 seconds. During the time that the interceptor valve is closed, action must be taken to add additional load to the generator.

When the generator is operating at or near its maximum power output, most of the torque provided by the turbines comes from the intermediate and low-pressure turbine stages whereas at lower power operation torque is substantially provided by the high-pressure turbine. Thus during high-power operation the rapid closing of the interceptor valves gives a momentary reduction in generator output, the reduced output being sustained by the high-pressure turbine stages. The main governor control valves remain open during this time. This is an advantage over prior art systems in that all steam flow to both the high- and low-pressure turbines is not cut off when it doesn't have to be. The level of the input pressure to output power and the amount of time for maintaining the interceptor valve in the closed position are adjustable to permit the user to adapt the device to fit the particular needs of the system.

Loss of the complete load is preferably sensed by the same means as that used in the case of the partial load loss, i.e., by the means used to sense an increase inlet steam pressure to output power ratio. However, in order to differentiate between a partial and a total load loss, a signal is also provided from a contact closure operative to sense the condition of the circuit breakers associated with the generator output. Thus when the necessary conditions are present to activate the protection system for a partial load loss, and additionally a signal is provided indicating that the circuit breakers have tripped and an open circuit exists means are then provided to close both the interceptor and main governor valves.

After a predetermined delay period, desirably on the order of 1 to 10 seconds depending upon the parameters of the system, and once the speed of the turbine has dropped below a predetermined value such as 103 percent of rated speed, means are provided to reset the load loss anticipator protection system.

Relatively high-pressure steam resulting from the closing of the interceptor valves remains in the reheat apparatus. In order to relieve this pressure, the present invention provides additional overspeed means for maintaining the interceptor and governor valves closed so long as the turbine speed exceeds rated speed by a predetermined amount. In the preferred embodiment, this value is 103 percent of rated speed.

Once the load loss anticipator protection system is reset, and the speed of the turbine drops below that necessary to maintain the overspeed means activated, the interceptor valve is reopened and the governor valve is under the control of the main EH control system. The latter maintains the governor valve in a substantially closed position since the EH controller will close the governor valve to maintain approximately 100 percent of rated speed.

Opening of the interceptor valve allows steam to flow through the lower pressure turbine stages which causes an increase of turbine speed. Once the speed reaches 103 percent of rated speed the overspeed means is triggered thereby closing the interceptor and governor valves. The latter would ordinarily be in a closed position anyway, as previously described. The turbine speed then begins to decrease until at 103 percent of rated speed the overspeed means relinquishes control of the governor and interceptor valves and the interceptor valve reopens, steam again flows through the lower pressure turbine stages, and the turbine speeds up until it reaches 103 percent of rated speed. This cyclical action is repeated until the reheated steam pressure is reduced to that necessary to maintain the turbine speed below 103 percent of rated speed.

As mentioned previously, the present system is only operative where the inlet pressure corresponds to a value greater than 30 percent of the rated load. Below this value it has been found that the steam turbine speed may be safely and effectively controlled by normal operation of the EH control system.

In accordance with the present invention tests are also provided to check the integrity of a variety of the components within the system including the auxiliary governor solenoid valve, the interceptor valve, and the transducers utilized to measure output power and inlet pressure. A test is also provided to provide assurance that the overspeed controller is triggered at the desired value.

By reacting quickly to either a total or partial load loss and in a manner commensurate with the kind of loss, the present system operates more effectively to prevent turbine overspeed than is possible with prior art systems.

Thus it is an object of the present invention to provide an overspeed protection system for a steam turbine which will aid in maintaining turbine stability during a partial loss of load by stopping steam flow to one or more lower pressure turbines.

Another object of the present invention is to provide a steam turbine protection system for a steam turbine having a high power-to-inertia ratio wherein improved capability is provided for maintaining turbine speeds below acceptable maximum levels during either a partial or total loss of the load.

A further object of the present invention is to provide a protection control system for steam turbines having high power-to-inertia ratios wherein measures are taken to initiate slowdown of a steam turbine even before appreciable speed buildup occurs due to partial or total load loss thereby preventing turbine damage which would otherwise occur from excess turbine speeds.

Another object of the present invention is to provide improved turbine protection in the event of a total load loss by the use of a protection system which operates in response to an increase in turbine speed above a predetermined speed and/or in response to a loss of load prior to a substantial increase in turbine speed.

Another object of the present invention is to provide an improved method of preventing damage to a steam turbine due to excessive speed buildups resulting from partial or total loss of the load.

BRIEF DESCRIPTION OF THE DRAWING

FIG. 3 is a block diagram of an integrity checking circuit utilized in the present invention.

DESCRIPTION OF THE PREFERRED EMBODIMENT

Figure 1:
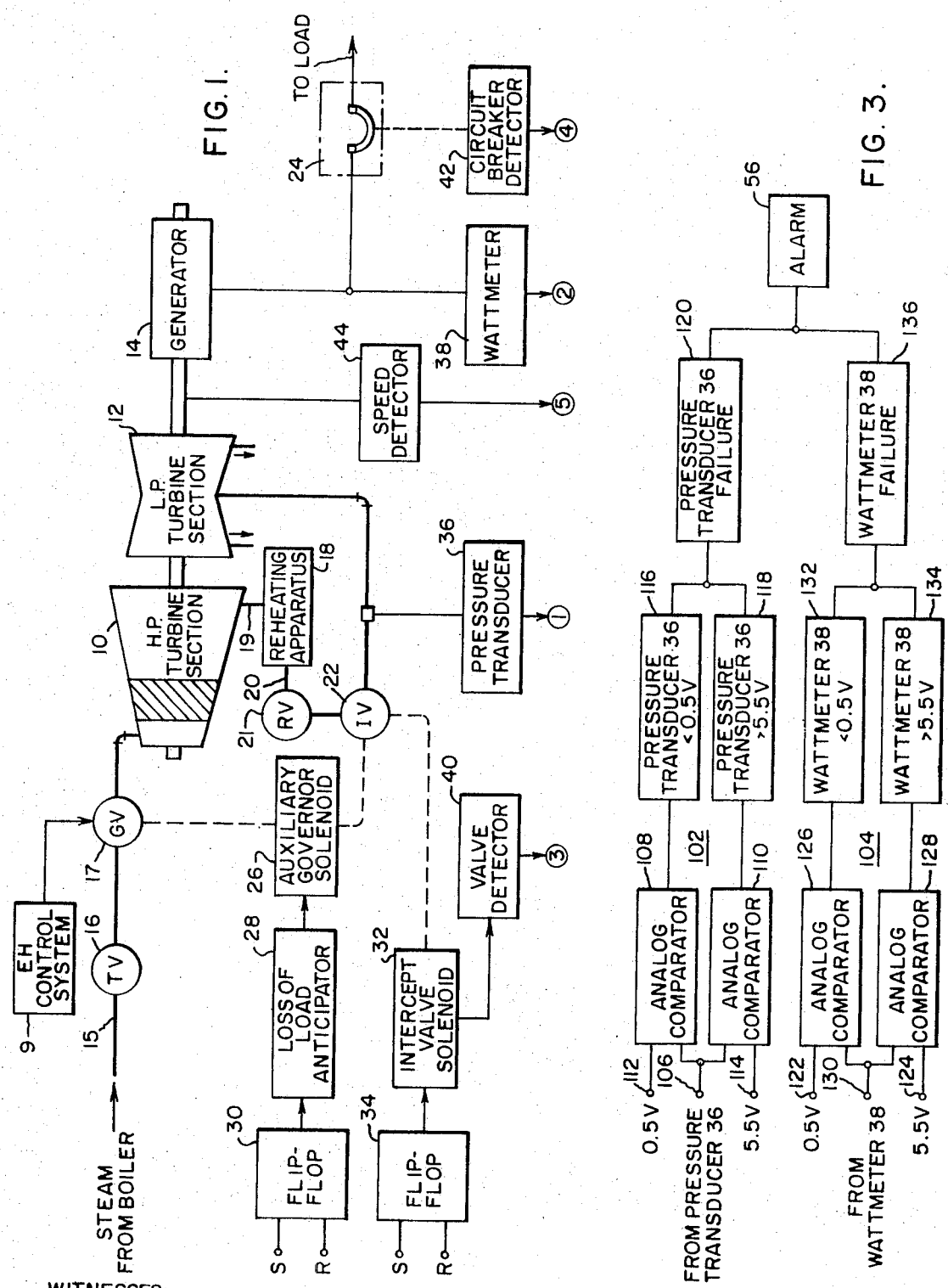
FIG. 1 schematically illustrates a multi-unit turbine-generator powerplant having the invention incorporated therein.

Referring to FIG. 1 there is shown a turbine generator powerplant having the high-pressure (H.P.) turbine unit 10, and a low-pressure (L.P.) turbine unit 12 connected in tandem and jointly driving an electric generator 14. Additional turbine stages may also be provided, such as additional high and low pressure stages and one or more intermediate pressure turbine stages located between the high- and low-pressure stages.

High-pressure motive steam from any suitable supply, for example a nuclear reactor (not shown) is admitted to the H.P. turbine unit 10 by a conduit 15 having interposed therein the usual throttle valve 16 and governor valve 17, both of which can comprise a plurality of valve structures. The governor valve 17 is controlled under normal operating conditions by EH control system 9. After partial expansion in the high-pressure turbine unit 10, the steam is directed to suitable reheating apparatus 18 by a conduit 19 and the reheated steam is then directed to the low pressure turbine unit 12 by a conduit 20 for further expansion. The conduit 20 has a conventional reheat stop valve 21 therein and an interceptor valve 22 interposed in the conduit 20 downstream of the reheat stop valve 21.

In normal operation, as thus far described, the throttle valve 16, the reheat stop valve 21, and the interceptor valve 22 are fully opened, and the governor valve 17 is regulated by the EH controller or other suitable control means to the degree of opening required to admit high-pressure steam to the turbine units at a rate effective to satisfy the load requirements of the generator 14. The electrical output from the generator 14 passes to the load through a suitable circuit breaker 24. Although the output from the generator is shown as single phase the generator can provide three-phase or other forms of output power in which case a corresponding number of circuit breakers are required.

The governor valve 17 and the interceptor valve 22 are opened and closed by operation of an auxiliary governor solenoid 26, which in turn is energized by loss of load anticipator 28. The latter is set or reset by a flip-flop 30. Control of the governor valve 17 by the load anticipator 28 is in addition to the control provided by the EH controller 9. More particularly, as will be described in detail subsequently, the anticipator 28 supersedes control of valve 17 if certain speed and power conditions exist. Additionally, the interceptor valve 22 may be opened and closed by operation of interceptor valve solenoid 32 which is set and reset by a flip-flop 34 in a manner described subsequently.

A pressure transducer 36 senses the pressure of the steam along the conduit 20 in the path between the valve 22 and the inlet to the low-pressure turbine stage 12. A wattmeter 38 or other suitable power-measuring device is coupled with the output of generator 14 to provide a signal representing the electrical power provided to the load by generator 14. A signal is provided by a valve detector to indicate the state of the interceptor valve 22, i.e., whether the interceptor valve 22 is opened or closed. the circuit breaker detector 42 similarly provides information relative to the state of the circuit breaker 24. Speed detector 44 provides a signal or representation indicative of the rotational velocity of the turbine generator shaft. All of the above described transducers may be of any suitable design well known in the art.

Figure 2:
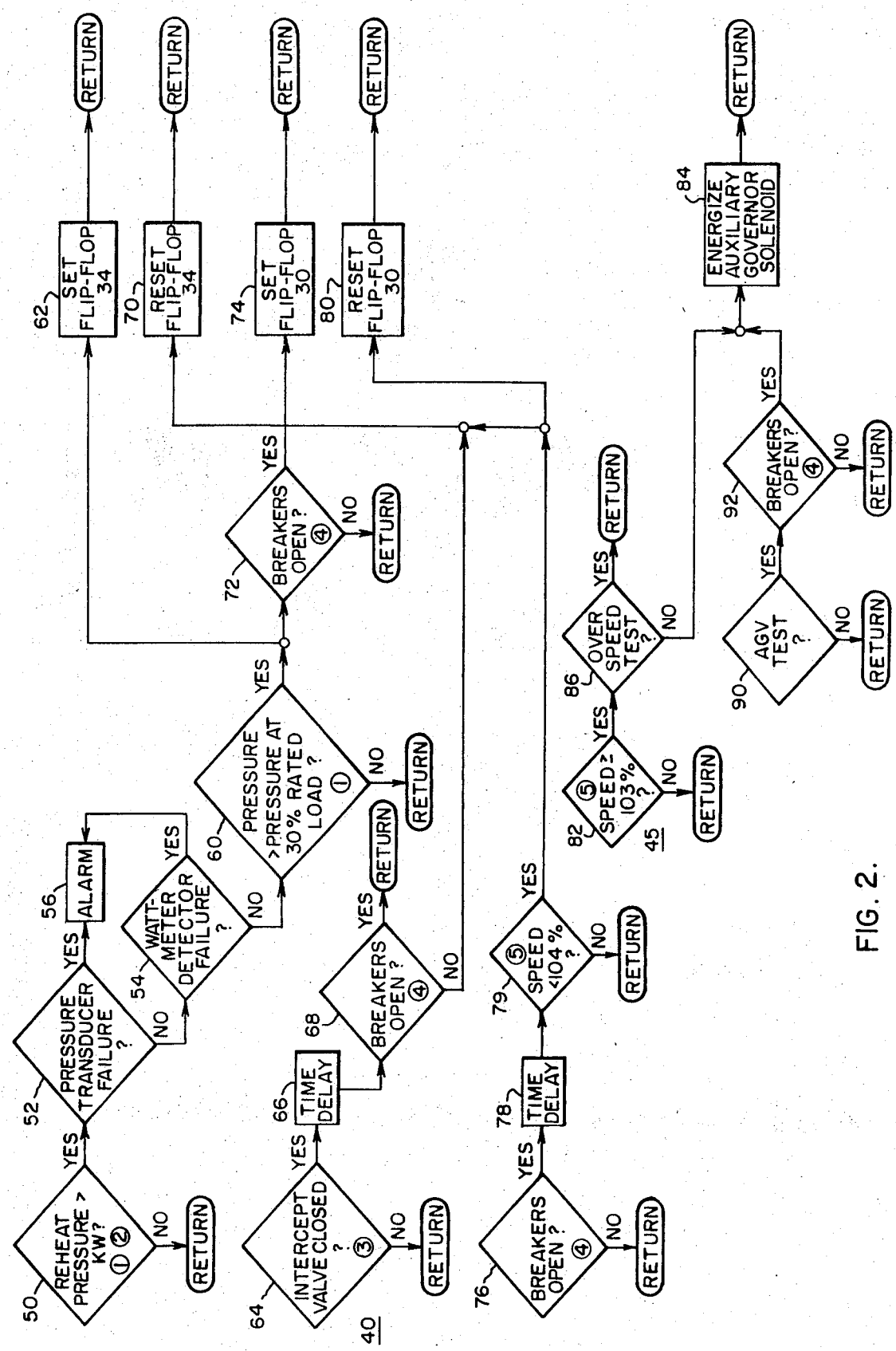
FIG. 2 shows a flow chart in accordance with the present invention suitable for utilization in the form of wired digital logic circuitry or in the form of a program for the computer illustrated in FIG. 4.

With reference to FIG. 2, there is shown therein a logic flow chart which is descriptive of the functioning of the system in accordance with the present invention. Outputs from the various transducers monitored at each block in the flow diagram are indicated by encircled numerals. Thus, in FIG. 1, the output from pressure transducer 36 is indicated by an encircled 1, wattmeter 38 by 2, valve detector 40 by 3, circuit breaker detector 42 by 4, and speed detector 44 by 5. In the preferred embodiment of the invention, the flow chart is embodied in the form of digital wired-logic circuitry according to techniques well known to those skilled in the art. In an alternate embodiment, the flow diagram can be embodied in the form of a computer program and utilized by a digital computer. The techniques for converting the chart into a suitable computer program are well-known techniques.

The RETURN symbol used extensively in FIG. 2 indicates that no further decisions are to be made along the flow design and that the sequence is to start again, i.e., the computer will begin the required operation farthest to the left (in FIG. 2) in the path in which the RETURN was encountered.

A loss of load anticipator protection system 40 is included in FIG. 2. A block 50, the pressure of the steam flowing into the low-pressure turbine 12, sensed by the pressure transducer 36 (FIG. 1), is compared with the electrical power, sensed by wattmeter 38, provided to the load. If the inlet pressure exceeds the expected output power in the manner described previously, checks are made to determine the operability of the pressure transducer 36 and the wattmeter 38 as indicated at 52 and 54 respectively. Should either the pressure transducer 36 or the wattmeter 38 be faulty, a visual alarm 56 is provided.

If the pressure transducer 36 and wattmeter 38 are operating properly, it is then determined at reference numeral 60 whether the reheat pressure corresponds to a value greater than 30 percent of rated load. If it doesn't, no action is taken since the EH controller is sufficiently capable to compensate for resulting speed increases. If it does, then a command is given as indicated by reference numeral 62 to set flip-flop 34 which acts to energize intercept valve solenoid 32 to close the interceptor valve 22. As discussed previously, closure of the interceptor valve 22 substantially stops further flow of steam through the low-pressure turbine 12 thereby preventing the turbine from exceeding its maximum permitted rotational velocity.

As indicated in block 64 the signal provided by the valve detector 40 is sensed to determine the status of intercept valve 22. If valve 22 is found to be closed, after a time delay 66 such as 0.6 to 1.2 seconds is generated and a check is made as indicated at reference block 68 to determine whether the circuit breaker 42 is open. If the breaker is open, indicating a total load loss, the present protection system operates in a manner described subsequently and no further action is taken by this part of the protection system. If the breakers are closed, a command is given at 70 to reset flip-flop 34 to deenergize the interceptor valve solenoid 32 and open the interceptor valve 22. During the time that the interceptor valve 22 is closed appropriate action is taken to add additional load to stabilize the system. If such remedial action is not taken, the interceptor valve 22 continues to be closed and re-opened until such time that additional load is provided. It is within the spirit of the invention, however, to provide means to stop such interceptor valve cycling after a predetermined number of cycles.

The foregoing is related to a method and apparatus for preventing damage to a steam turbine from turbine overspeed caused by a partial loss of the load. In the event of a total loss of load, the following action is taken by the loss of load anticipator protection system 40.

A total load loss is determined after a yes-determination at block 60 as indicated by reference numeral 72 by monitoring the circuit breaker detector 42 since the status of the circuit breaker 24 indicates whether an open circuit exists between the output of the generator 14 and the load. Since the operation performed at reference numeral 72 is subsequent to and in the same logic flow path as the operations performed at 50, 52, 54 and 60, a total loss of load is determined on the basis of the criteria for a partial load loss in addition to the opening of circuit breaker 24. If the breaker 24 is open, a command is given as indicated by reference numeral 74 to set the flip-flop 30 which causes the loss of load anticipator 28 to energize the auxiliary governor solenoid 26. Thus, the governor valve 17 and the interceptor valve 22 are both closed thereby stopping further flow of steam through both the HP and LP turbine stages. This prevents the turbine speed from exceeding the maximum allowed turbine value even where the turbine has a high power-to-inertia ratio as found in modern turbine designs. By closing both the main governor and the interceptor valves the flow of steam is rapidly reduced. This should be compared with the response to a partial load loss where steam is prevented momentarily from entering the lower pressure turbine, thereby only reducing generator output. This provides great flexibility in responding to a partial or total loss of load, a flexibility not found in prior art devices. A check is made at 76 to determine if the circuit breaker is open. If so, after a time delay of from 1.0 to 10.0 seconds at 78, a check is made as indicated by reference numeral 79 to determine whether or not the speed of the turbine is less than 103 percent of rated speed, the speed being sensed by speed detector 44. The time delay 78 is provided to assure peaking of the turbine speed before the loss of load anticipator deenergizes the auxiliary governor solenoid.

Further protection is provided to avoid premature deactivation of the auxiliary governor solenoid 26 by providing a speed check at 79. If the speed has decreased below a predetermined value, desirably 103 percent of rated speed, both flip-flops 30 and 34 are reset by commands from blocks 80 and 70 respectively to deenergize the interceptor valve solenoid 32 and open the interceptor valve 22.

In addition to the load loss anticipator system 40 of the present protection system, there is additionally provided overspeed means 45 which is operable to activate the loss of load anticipator 28 to close the steam valves 17 and 22 whenever the turbine speed exceeds a predetermined value such as 103 percent of rated speed. The overspeed means 45 should not be confused with the EH controller, however, which is operable to control only the main governor valve. The overspeed means provides two main functions. First, it acts to close both the interceptor and governor valves whenever the speed reaches 103 percent of rated speed regardless of whether or not the conditions are present to activate the loss of load-anticipating portion of the protection system described above. Second, it cooperates with both the EH controller and the loss of load-anticipating portion of the protection system during the time period following a loss of load condition when the turbine speed is brought down to rated speed.

Once the turbine speed drops below 103 percent of rated speed, the auxiliary governor solenoid 26 is deenergized and the EH controller 9 takes over control of the governor valve 17. Since the interceptor valve 22 is open and the governor valve remains closed because of the EH controller which senses a speed in excess of rated speed, steam remaining in the reheating apparatus 18 flows through LP turbine stage 12 causing an increase in turbine speed. If the speed increases above 103 percent of rated speed, block 82 acts through block 84 again to close the interceptor valve 22, the governor valve 17 already being closed. When the speed again decreases below 103 percent of rated speed, the interceptor valve 22 is again opened and the EH controller 9 takes over control of the governor valve 17. This cycling process allows modulation of the captured steam and continues until the turbine speed remains below 103 percent rated speed.

At reference numeral 86, a check is provided to determine if an actual overspeed trip set point test is being performed. Thus, if a test is being made no action is taken to energize the auxiliary governor solenoid.

It is desirable to test the operation of the auxiliary governor solenoid to insure that the governor and interceptor valves are operating properly. Such a decision is made at block 90. Such a test would only be made under no-load conditions. Thus a check is made at block 92 to determine whether the circuit breaker 24 is open. If it is then a command will be given at reference numeral 84 to energize the auxiliary governor solenoid and the operation of the valves may be observed.

FIG. 3 illustrates a test system for performing the pressure transducer integrity checks carried out at 52 and 54 in FIG. 2. The pressure transducer integrity check is performed by that part of the block diagram indicated by reference numeral 102 and the wattmeter check by that part indicated by reference numeral 104.

The signal from the pressure transducer 36 is inputted to the pressure transducer integrity circuit 102 at 106 to two analog comparators 108 and 110. A low reference voltage of +0.5 volts is provided at input 112 of the comparator 108 and a high reference voltage of +5.5 volts is provided at input 114 of the comparator 110. At 116 a check is made to see whether the difference between the +0.5 volts reference voltage and the output voltage from the transducer 36 is less than 0.5 volts. If it is, the transducer 36 is operating below the range of possible normal operation and a signal is provided by pressure transducer failure means 120 to energize an alarm 56. Likewise, if the difference between the +5.5 volts reference voltage and transducer 36 voltage is greater than 5.5 volts, the transducer 36 is above the normal possible operating range and pressure transducer failure means 120 provides a signal to energize the alarm 56.

Operation of the wattmeter integrity circuit 104 is similar to that for the pressure transducer integrity circuit 102. Reference voltages of +0.5 volts and +5.5 volts are applied to inputs 122 and 124 of analog comparators 126 and 128 respectively. The output from wattmeter 38 is inputted to comparators 126 and 128 at 130. Upper and lower range checks are made at 132 and 134 respectively, and, in the event a failure has occurred, wattmeter failure means 136 provides a signal to energize the alarm 56.

Figure 4:
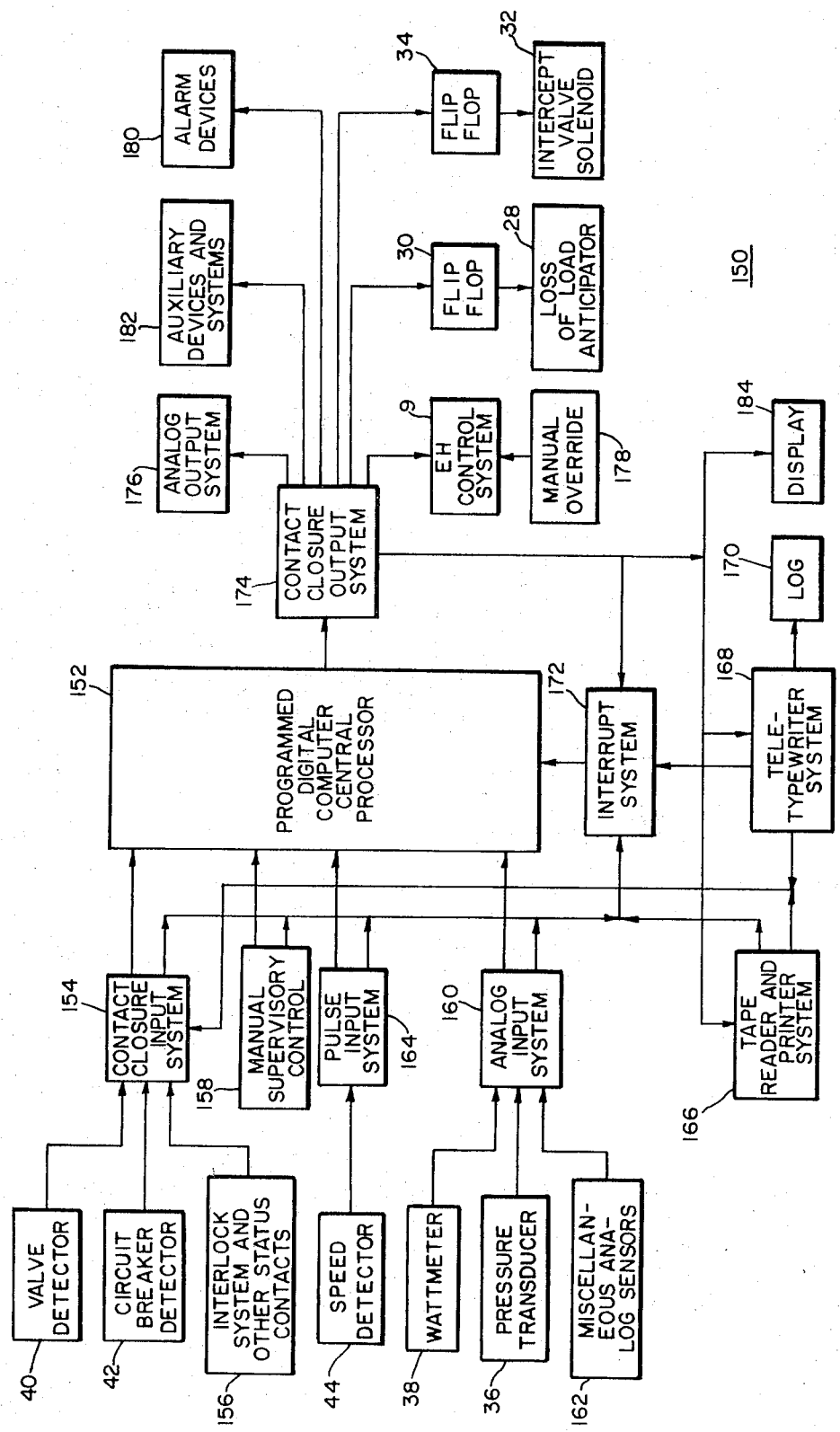
FIG. 4 is a block diagram of a typical programmed digital computer system which is utilized with one embodiment of the present invention.

In another embodiment of the present invention the flow diagram of FIG. 2 may be incorporated in a program for a digital computer, such as the programmed digital computer control system 150 shown in FIG. 4. The programmed digital computer control system 150 can include conventional hardware in the form of a central processor 152 and associated input/output interfacing equipment such as that sold by Westinghouse Electric Corporation under the trade name "Prodac 50" (P50) or "Prodac 2000" (P2000). In other cases such as when the turbines 10 and 12 as well as other plant equipment units are placed under computer control, use can be made of multiple P50's or use may be made of large computer system such as that sold by Westinghouse Electric Corporation and known as the Prodac 250 can be employed. In the case of plural computers, control process interaction is achieved by tying the separate computers together through data links and/or other means.

Generally, the P2000 typically uses an integral magnetic core which can range from 4,000 to 64,000 words of memory (expandable in increments of 4,000 words) with cycle times of 3.0 microseconds or less than 1.0 microseconds. Other options such as mass memory (disc or drum) and floating point may also be utilized.

The P250 typically uses an integral magnetic core 16,000-word (16-bit plus parity) memory with 900-nanosecond cycle time, an external magnetic core of 12,000-word or more (16-bit plus parity) memory with 1.1-microsecond cycle time and a mass 375,000-word or more (16 bit plus parity) random access disc memory unit. The P50 processor typically uses an integral magnetic core 12,000 word (14-bit) memory with 4.5-microsecond cycle time.

The interfacing equipment for the computer processor 152 includes a conventional contact closure input system 154 which scans contact or other similar signals representing the status of various plant and equipment conditions, including for example the valve detector 40 and the circuit breaker detector 42 as well as others otherwise generally indicated by the reference character 156. The status contacts might typically be contacts of mercury-wetted relays (not shown) which are operated by energization circuits (not shown) capable of sensing the predetermined conditions associated with the various system devices. Status contact data is used in interlock logic functioning in control of other programs, programmed monitoring and logging and demand logging, functioning of a computer executed manual supervisory control 158, etc.

Input interfacing is also provided by conventional analog input system 160 which samples analog signals from the turbine generator plant at a predetermined rate such as 15 points per second for each analog channel input and converts the signal samples to digital values for computer entry. The analog signals are generated by the wattmeter 38, the pressure transducer 36, and miscellaneous analog sensors 162 such as various steam flow detectors, various steam temperature detectors, miscellaneous equipment operating temperature detectors, generator hydrogen coolant pressure and temperature detectors, etc. A conventional pulse input system 164 provides for computer entry of pulse-type detector signals such as those generated by the speed detector 44. The computer counterparts of the analog and pulse input signals are used in control-programmed and demand logging, etc.

Information input and output devices provide for computer entry and output of coded and noncoded information. These devices include a conventional tape reader and printer system 166 which is used for various purposes including for example program entry into the central processor core memory. A conventional teletypewriter system 168 is also provided and it is used for purposes including, for example, logging printouts as indicated by the reference character 170.

A conventional interrupt system 172 is provided with suitable hardware and circuitry for controlling the input and output transfer of information between the computer processor 152 and the slower input/output equipment. Thus, an interrupt signal is applied to the processor 152 when an input is ready for entry or when an output transfer has been completed. In general, the central processor 152 acts on interrupts in accordance with a conventional executive program. In some cases, particular interrupts are acknowledged and operated upon without executive priority limitations.

Output interfacing is provided for the computer by means of a conventional contact closure output system 174 which operates in conjunction with a conventional analog output system 176 and with the EH control system 9. A manual control 178 (not shown in FIG. 1) is coupled to the valve position control output system and is operable therewith to provide manual turbine control during computer shutdown and other desired time periods.

Certain computer digital outputs are applied directly in effecting program determined and contact controlled control actions of equipment including the operation of flip-flops 30 and 34 which activate and deactivate the loss of load anticipator and the intercept valve solenoid 32, alarm devices 180 such as buzzers and displays, and predetermined plant auxiliary devices and systems 182 such as the generator hydrogen coolant system. Computer digital information outputs are similarly applied directly to the tape printer and the teletypewriter system 168 and display devices 184.

Other computer digital output signals are first converted to analog signals through functioning of the analog output system 176 and the valve position control output system 90. The analog signals are then applied to the auxiliary devices and systems 182 and the various valve controls (not shown) in effecting program determined control actions.

A steam turbine control programming system is employed to operate the computer system 150. It includes control and related programs as well as certain conventional housekeeping programs directed to internal control of the functioning of the computer system itself. The latter include, in addition to the overspeed protection system described above, the following:

1. Priority Executive Program

Controls the use of the processor circuitry. In general, it does so on the basis of priority classification of all of the control and housekeeping programs and some of the various kinds of interrupts. The highest bidding program or interrupt routine is determined and allowed to run when a change is to be made in the programmed instructions undergoing execution. Some interrupt routines run outside the priority structure as already indicated, particularly where safety and/or expensive equipment protection are involved.

2. Analog Scan

Periodic execution for the entry of predetermined analog inputs which have been converted by the analog input system 164 and stored in the analog input system buffer register.

3. Status Contact Scan

Periodic execution for the entry of predetermined status contact inputs.

4. Programmers Entry Program

Demand execution allows the computer operator to enter information into the computer memory.

5. Diagnostic Routine

Executed upon computer system malfunction interrupt.

The programming system control and related programs include the following:

1. Data Logging

Periodic or demand execution for printout of predetermined events and parameter values.

2. Alarm

Periodic and process interrupt execution for operating the alarm devices 178 and other system devices.

3. Display

Periodic and demand execution for visual display (alpha numeric or graphic) of predetermined parameter values and/or trends.

4. HP Valve Fluid Program

Periodic execution for supervisory control.

5. Lubrication System Program

Periodic execution for supervisory control.

6. Auxiliary Devices and Systems Programs

Periodic execution for supervisory control.

7. Throttle and Governor Steam Valve Position Control Program

Periodic execution for control purposes.

The foregoing description has been presented only to illustrate the principles of the invention. Accordingly, it is desired that the invention not be limited by the embodiment described but, rather, that it be accorded an interpretation consistent with the scope and its broad principles.

We claim as our invention:

1. A protection system for a steam turbine generating plant for preventing excessive turbine speeds due to a partial loss of the electrical load, the generating plant comprising at least one high-pressure and at least one lower pressure turbine, a generator rotated by said turbines, means for reheating steam passing between the high- and low-pressure turbines, and at least one interceptor valve connected in the steam path including the high and lower pressure turbines and the reheating means, said protection system comprising:
   a. means for sensing the steam pressure provided to the inlet of the lower pressure turbine;
   b. means for sensing the output power provided to the load;
   c. means for providing a representation of the ratio of said sensed input pressure and said output power; and
   d. means for closing the interceptor valve for a predetermined period of time of sufficiently long duration to allow additional electrical load to be connected to said generator but not of sufficiently long duration to cause a plant shutdown, when the valve of said representation exceeds a predetermined value.

2. A protection system as set forth in claim 1 including a solenoid valve operable to open and close the interceptor valve, wherein said means for closing the interceptor valve comprises means for energizing said solenoid valve during the predetermined period of time.

3. A protection system as set forth in claim 1 wherein said means for closing the interceptor valve includes means operable only when the pressure of the steam provided to the inlet of the lower pressure turbine corresponds to a value greater than a predetermined percentage of rated load.

4. A protection system as set forth in claim 3 wherein said predetermined percentage is 30 percent.

5. A protection system as set forth in claim 1 including means for determining the integrity of said output power-sensing means and said steam pressure means and providing an alarm signal in the event of a fault in one or both of said power-sensing and said steam pressure means.

6. A protection system as set forth in claim 4 wherein the predetermined period of time is between 0.6 and 1.2 seconds.

7. A protection system as set forth in claim 1 including means responsive to a total loss of load for preventing additional steam from passing through the high and lower pressure turbine stages.

8. A protection system as set forth in claim 6 including means for determining the integrity of said pressure and power-sensing means and for providing an alarm signal in the event of a fault in either or both of said pressure and power-sensing means.

9. A control system for a steam turbine generating plant to protect against excessive turbine speeds due to a partial loss or total loss of the electrical load, the generating plant comprising at least one high-pressure and at least one lower pressure steam turbine, an electrical generator rotated by said turbines, apparatus for reheating steam passing between the high- and low-pressure turbines, and main control means for regulating the generating plant output, said control system comprising:
   first means responsive to a predetermined relationship ratio between the pressure in one of said turbines and a representation of the power delivered to said load, said relationship representing a partial loss of load, for stopping the flow of steam to the lower pressure turbine for a predetermined period of time; and
   second means responsive to a total loss of load for stopping the flow of steam to both the high- and low-pressure turbines when the turbine speed drops below a first predetermined value above rated speed.

10. A control system as in claim 9 including third means responsive to the rotational velocity of the turbines for stopping the flow of steam to both the high- and low-pressure turbines whenever the rotational speed of the turbines exceeds a second predetermined value.

11. A protection system as set forth in claim 10 wherein said relationship for determining that a partial loss of the load has occurred exists whenever the ratio of the steam pressure at the inlet to the lower pressure turbine to the output electrical power provided to the load is exceeded by a predetermined amount.

12. A protection system as set forth in claim 11 wherein said second means includes means for determining that a total loss of the load has occurred whenever the inlet steam pressure exceeds the output power by a predetermined amount and an open circuit exists between the generator and load.

13. A protection system as set forth in claim 12 including a circuit breaker associated with the generator output and wherein an open circuit is determined by sensing said circuit breaker in its open state.

14. A protection system as set forth in claim 12 including a governor valve for regulating the amount of steam to said high-pressure turbine, an interceptor valve located in the path between the reheating apparatus and the lower pressure turbine, and wherein said first means includes means for closing the interceptor valve for said predetermined period of time.

15. A protection system as set forth in claim 14 wherein both said second and third means includes means for closing the interceptor and governor valves.

16. A protection system as set forth in claim 15 wherein said predetermined period of time is between 0.6 and 1.2 seconds.

17. A protection system as set forth in claim 13 wherein said first predetermined value is at least as great as said second predetermined value.

18. A protection system as set forth in claim 14 wherein said second means is operative to detect the restoration of the load by sensing that the circuit breaker is closed.

19. A protection system as set forth in claim 15 wherein a predetermined time delay occurs between the time the load is restored and the turbine speed determination is made by said second means.

20. A protection system as set forth in claim 10 wherein said second means is only operable when the steam pressure at the inlet to the lower pressure turbine is greater than a predetermined percentage of rated load.

21. A protection system as set forth in claim 15 wherein said second means is only operable when the steam pressure at the inlet to the lower pressure turbine is greater than a predetermined percentage of rated load.

22. A protection system as set forth in claim 21 wherein said predetermined percentage is 30 percent.

23. A method of preventing overspeeds in a steam turbine generating system resulting from partial or total load losses, said steam turbine generating system comprising at least one high-pressure turbine and a control valve associated therewith, at least one lower pressure turbine, and an interceptor valve associated therewith, means for reheating steam flowing between the high- and low-pressure turbines, and an electrical generator rotated by said turbines, including the steps of:
closing the interceptor valve for a predetermined time period of sufficiently long duration to allow additional electrical load to be connected to said generator but not of sufficiently long duration to cause a plant shutdown, whenever the ratio of the steam pressure at the input of the lower pressure turbine to the output power provided for the electrical load is exceeded by a predetermined amount;
closing both the control and interceptor valves whenever the ratio of the steam pressure at the input of the lower pressure turbine to the output power provided to the load is exceeded by a predetermined amount and an open circuit exists between the generator and the load;
maintaining the control and interceptor valves closed so long as the rotational velocity of the turbine generator exceeds a predetermined velocity.

24. A method for operating a turbine control system including a digital computer so as to prevent overspeeds in a steam turbine generating system resulting from partial or total load losses, said steam turbine generating system comprising at least one high-pressure turbine and a control valve associated therewith, at least one lower pressure turbine, and an interceptor valve associated therewith, means for reheating steam flowing between the high- and low-pressure turbines, and an electrical generator rotated by said turbines, including the steps of:
inputting a signal to said digital computer as data from means for sensing the steam pressure provided at an inlet of said turbines, and storing said data representing pressure in said digital computer;
inputting a signal to said computer as data from means for sensing the output power from said steam turbine generating system and storing said data representing power in said computer;
operating said computer to determine a ratio relationship between said data representing said signals for the pressure and the power;
operating said computer to compare said ratio relationship with stored data of predetermined magnitude;
closing the interceptor valve for a predetermined time period whenever the ratio of the steam pressure at the input to the lower pressure turbine to the output power provided to the load is exceeded by a predetermined amount;
closing both the control and interceptor valves whenever the output power provided to the load is exceeded by the steam pressure at the input of the lower pressure turbine by a predetermined amount and an open circuit exists between the generator and the load;
maintaining the control and interceptor valves closed so long as the rotational velocity of the turbine generator exceeds a predetermined velocity.

25. A method as set forth in claim 24 including the step of:
cycling said interceptor valve open and closed thereby allowing captured steam to escape.

26. A method of preventing overspeeds in a steam turbine generating system resulting from partial or total load losses, said steam turbine generating system comprising at least one high-pressure turbine and a control valve associated therewith, at least one lower pressure turbine, and an interceptor valve associated therewith, means for reheating steam flowing between the high- and low-pressure turbines, and an electrical generator rotated by said turbines, including the steps of:
closing the interceptor valve for a predetermined time period of sufficiently long duration to allow additional electrical load to be connected to said generator but not of sufficiently long duration to cause a plant shutdown, whenever the ratio of the steam pressure at the input of the lower pressure turbine to the output power provided to the electrical load is exceeded by a predetermined amount;
switching additional electrical load to an output of said generator subsequent to the closing of the interceptor valve.

27. An electric power generation system comprising:
a steam turbine system, said steam turbine system including plant control means, at least one high-pressure turbine and a control valve associated therewith, at least one lower pressure turbine, and an interceptor valve associated therewith, means for reheating steam flowing between the high- and low-pressure turbines, and an electrical generator rotated by said turbines,
said lower pressure turbine having at least one inlet for steam,
means for sensing the pressure of steam provided to said inlet of said lower pressure turbine,
means for sensing the output power provided to an electrical load,
means for providing a representation of the ratio between said pressure of steam to said inlet and said output power to said electrical load,
means for varying the position of said interceptor and said control valves,
means connecting said positioning means to said plant control means,
said positioning means including means for closing said interceptor valve for a time period predetermined by the physical characteristics of said generating system, said closing occurring whenever the ratio of the steam pressure at said inlet to said low-pressure turbine to the output power provided to said load exceeds a predetermined ratio corresponding to a partial loss of electrical load, said positioning means including means for closing said interceptor and said control valves whenever the ratio of the steam pressure at said inlet to said low-pressure turbine to the output power provided to said load exceeds a predetermined ratio for a predetermined time period and an open circuit exists between said generator and said electrical load, said positioning means maintaining said control and interceptor valves in a closed position as long as the rotational velocity of said electric power generation system exceeds a predetermined velocity.

28. The system as set forth in claim 9 in which said first means includes an interceptor valve which is closed for a predetermined time period of sufficient duration to allow additional electrical load to be connected to said generator but not of sufficiently long duration to cause a plant shutdown.

29. An electric power generation system comprising:

a steam turbine system, said steam turbine system including plant control means, at least one high-pressure turbine and a control valve associated therewith, at least one lower pressure turbine, and an interceptor valve associated therewith, means for reheating steam flowing between the high- and low-pressure turbines, an electrical generator rotated by said turbines, a load connected to said generator;

first means responsive to a predetermined relationship ratio between the pressure in one of said turbines and a representation of the power delivered to said load, said relationship representing a partial loss of load, for stopping the flow of steam to the lower pressure turbine for a predetermined period of time; and second means responsive to a total loss of load for stopping the flow of steam to both the high- and low-pressure turbines when the turbine speed drops below a first predetermined value above rated speed.

* * * * *